United States Patent
Huang et al.

(10) Patent No.: US 11,599,101 B2
(45) Date of Patent: Mar. 7, 2023

(54) INDEPENDENT MOVER TRANSPORT SYSTEM AND METHOD OF EXTENDING RANGE OF OPERATIONS IN AN INDEPENDENT MOVER TRANSPORT SYSTEM

(71) Applicant: Rockwell Automation Technologies, Inc., Mayfield Heights, OH (US)

(72) Inventors: Yuhong Huang, Acton, MA (US); Brian M. Perreault, Stow, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 435 days.

(21) Appl. No.: 16/802,095

(22) Filed: Feb. 26, 2020

(65) Prior Publication Data
US 2021/0261351 A1 Aug. 26, 2021

(51) Int. Cl.
*B65G 54/02* (2006.01)
*G05B 19/418* (2006.01)
*B65G 25/06* (2006.01)
*B65G 43/00* (2006.01)

(52) U.S. Cl.
CPC .......... *G05B 19/4189* (2013.01); *B65G 25/06* (2013.01); *B65G 43/00* (2013.01); *B65G 2203/0283* (2013.01); *B65G 2203/043* (2013.01)

(58) Field of Classification Search
None
See application file for complete search history.

(56) References Cited

U.S. PATENT DOCUMENTS

| 3,824,414 | A | * | 7/1974 | Laithwaite | H02K 41/025 310/13 |
| 4,825,111 | A | * | 4/1989 | Hommes | B60L 15/005 318/135 |
| 6,039,316 | A | * | 3/2000 | Jackson | B65H 7/20 271/194 |
| 6,876,896 | B1 | * | 4/2005 | Ortiz | B29C 65/7867 318/135 |

(Continued)

FOREIGN PATENT DOCUMENTS

| EP | 1270312 A1 | 1/2003 |
| EP | 3148904 A1 | 4/2017 |

OTHER PUBLICATIONS

Extended European Search Report dated Jun. 24, 2021; Application No. 21158153.3—(8) pages.

(Continued)

*Primary Examiner* — Joseph A Dillon, Jr.
(74) *Attorney, Agent, or Firm* — Boyle Fredrickson, SC

(57) ABSTRACT

An independent mover transport system and related method. The system comprises a mover having an axis, and a track. The track includes first and second track segments, and a controller operative to drive a first coil of the first track segment to control movement of the mover along the first track segment towards the second track segment. The controller is further operative to define a first zone for the first track segment, define a second zone for the first track segment, drive the first coil to control movement of the mover with the first set of controller gain values when the location of the axis is in the first zone, and drive the first coil to control movement of the mover with second set of controller gain values when the location of the axis is in the second zone.

18 Claims, 15 Drawing Sheets

(56) References Cited

U.S. PATENT DOCUMENTS

| | | | | |
|---|---|---|---|---|
| 7,280,889 | B2* | 10/2007 | Knepple | B65G 47/30 198/460.1 |
| 8,397,896 | B2* | 3/2013 | Kleinikkink | B65G 33/04 198/747 |
| 8,757,363 | B2* | 6/2014 | Combs | G05B 19/4189 198/781.01 |
| 9,505,560 | B2* | 11/2016 | Kleinikkink | G05B 19/4185 |
| 9,847,742 | B2* | 12/2017 | Suzuki | H02P 6/006 |
| 10,106,339 | B2* | 10/2018 | Prüssmeier | B65G 35/06 |
| 10,432,117 | B1* | 10/2019 | Huang | B65G 51/03 |
| 10,442,637 | B2* | 10/2019 | Huang | G05B 19/195 |
| 10,454,356 | B2* | 10/2019 | Borghi | H02K 41/033 |
| 10,562,715 | B2* | 2/2020 | Huang | B60L 15/005 |
| 10,720,864 | B2* | 7/2020 | Huang | B65G 23/00 |
| 10,914,620 | B2* | 2/2021 | Huang | G01D 18/006 |
| 11,027,615 | B2* | 6/2021 | Huang | B60L 13/03 |
| 11,117,471 | B2* | 9/2021 | Huang | B60L 3/0015 |
| 11,161,701 | B2* | 11/2021 | Weber | B65G 43/00 |
| 11,307,067 | B2* | 4/2022 | Huang | G01D 5/145 |
| 11,312,574 | B2* | 4/2022 | Huang | B65G 1/1375 |
| 2014/0097783 | A1 | 4/2014 | Hara | |
| 2015/0028699 | A1* | 1/2015 | Hofstetter | H02K 41/02 310/12.32 |
| 2017/0346379 | A1* | 11/2017 | Weber | H02K 41/031 |
| 2019/0006930 | A1 | 1/2019 | Weber et al. | |
| 2019/0077608 | A1* | 3/2019 | Huang | B65G 43/06 |
| 2019/0078950 | A1* | 3/2019 | Huang | H02P 6/183 |
| 2019/0084781 | A1* | 3/2019 | Huang | G05B 19/195 |
| 2019/0393813 | A1* | 12/2019 | Huang | B65G 54/02 |
| 2020/0148481 | A1* | 5/2020 | Huang | B65G 43/06 |
| 2020/0166389 | A1* | 5/2020 | Huang | G01D 18/008 |
| 2020/0171953 | A1* | 6/2020 | Huang | B60L 15/005 |
| 2020/0171958 | A1* | 6/2020 | Huang | B60L 13/10 |
| 2021/0088081 | A1* | 3/2021 | Huang | B65G 54/02 |
| 2021/0131839 | A1* | 5/2021 | Huang | G01D 18/008 |
| 2021/0253351 | A1* | 8/2021 | Huang | G05B 19/042 |
| 2021/0370777 | A1* | 12/2021 | Huang | B60L 15/005 |
| 2021/0384765 | A1* | 12/2021 | Das | H02J 50/10 |
| 2022/0063924 | A1* | 3/2022 | Huang | H02P 25/06 |

OTHER PUBLICATIONS

European Search Report dated Dec. 12, 2022; Application No. 21158153.3—(11) pages.

* cited by examiner

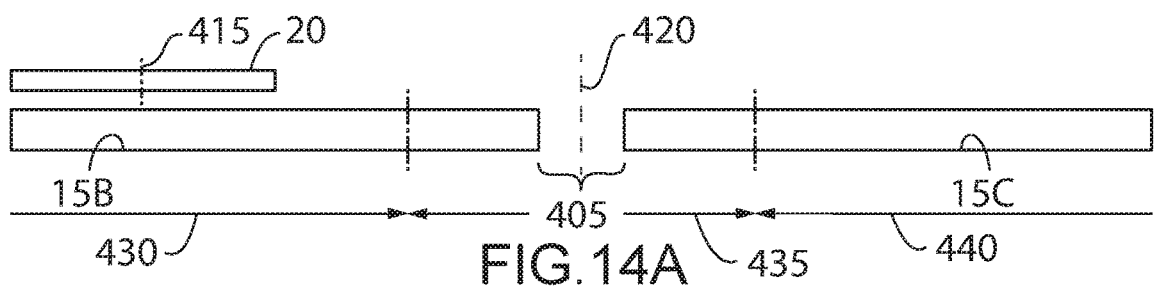
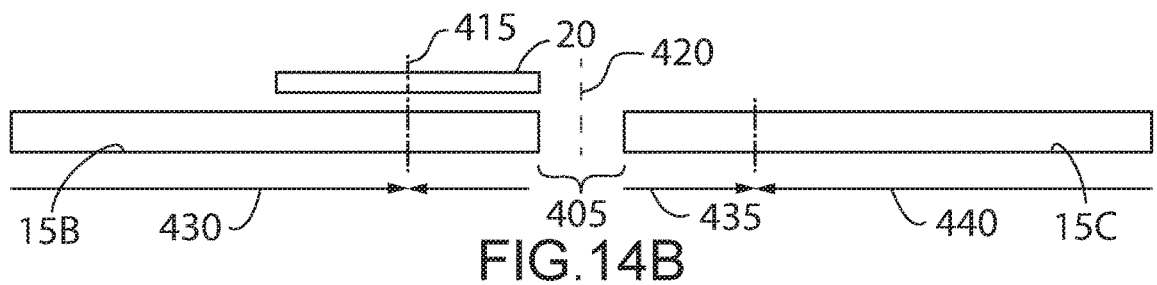
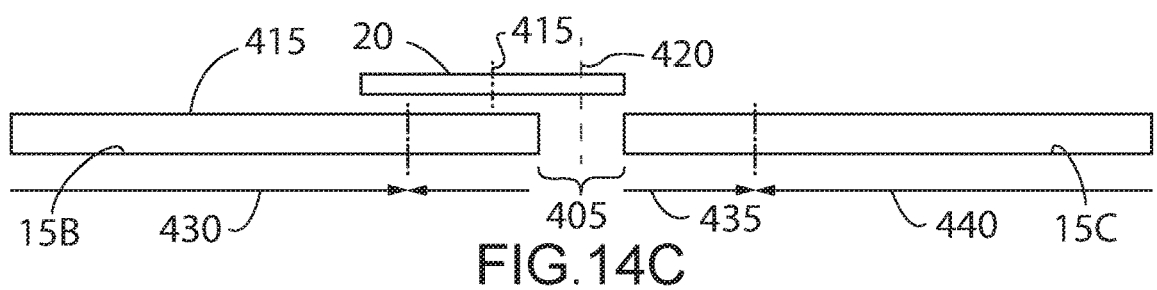
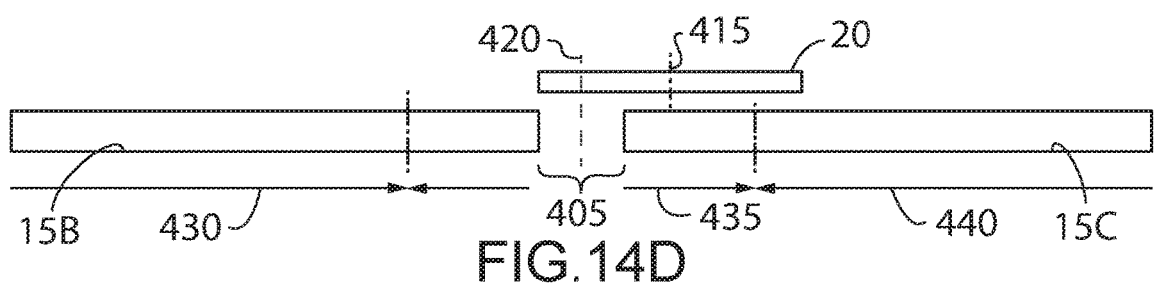
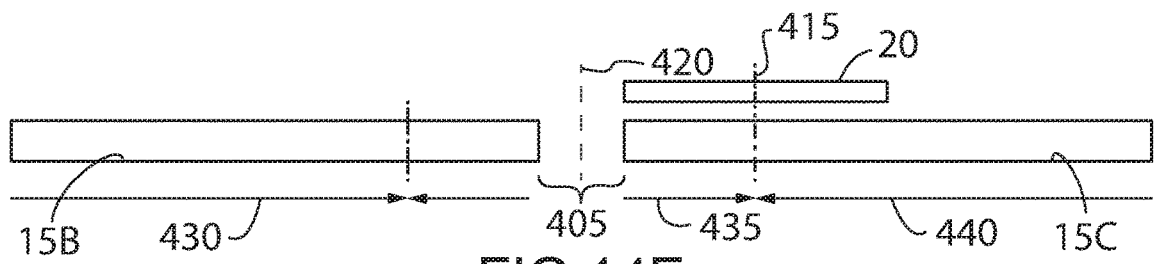
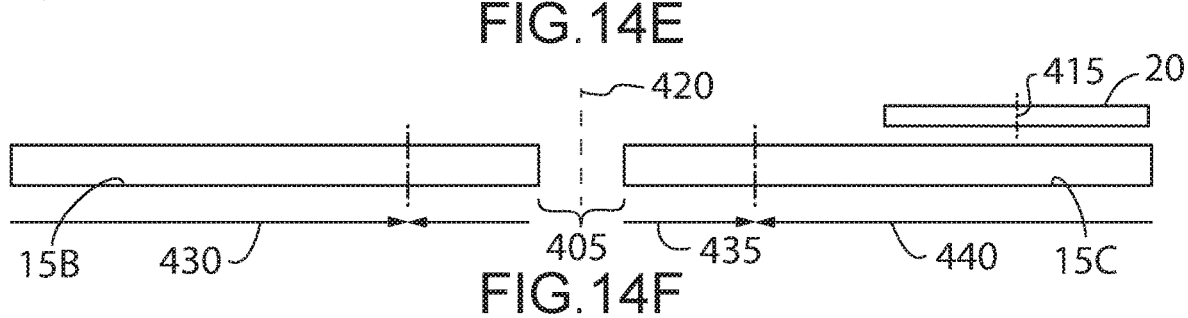

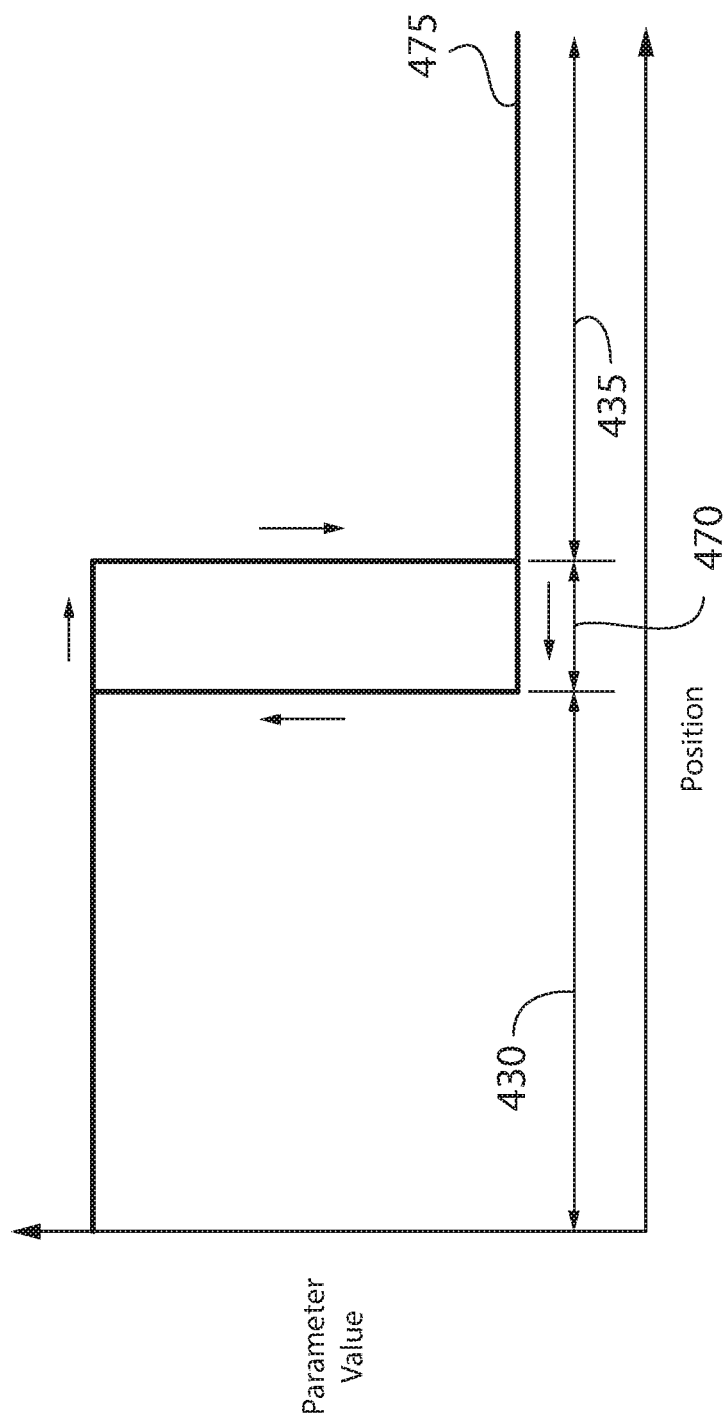

INDEPENDENT MOVER TRANSPORT SYSTEM AND METHOD OF EXTENDING RANGE OF OPERATIONS IN AN INDEPENDENT MOVER TRANSPORT SYSTEM

BACKGROUND INFORMATION

The present invention relates to motion control systems and, more specifically, to improved control of movers traveling among track segments in a linear drive system.

Motion control systems utilizing movers and linear drives can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled "movers," each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

For some implementations, a motion control system includes a distributed control system. In such a system, each mover is individually controlled by the track segment on which the vehicle travels. As the mover moves from one track segment to another track segment, the motion control and tracking of the mover are handed off from one segment to the other. At the track segment junctions, the physical gap among segment coils posts particular challenges to motion control.

First, the absence of an active driving coil at the segment junction results in the reduction in thrust available for mover control. Second, with iron-core movers, the air gap at the segment junction also represents the disruption of cogging force patterns due to the order of magnitude differences in magnetic permeability between the iron core and air. Third, the discrepancies between adjacent movers in a mover position feedback signal and controller timing results in uncertainties in system dynamics.

As a result, track portions around the segment junctions are declared "no-station zones," which refer to portions of the track that actuators should not interact with a mover (e.g., to load or unload the mover). The inclusion of no-station zones limits flexibility with customer system design and increases system cost and floor space. Track designers desire a better system to reduce or remove "no-station zones," thereby decreasing system cost and improving floor space. Thus, it would be desirable to provide an improved method and system for controlling operation of the mover as it transitions between track segments to reduce pulsations occurring during the transition.

BRIEF DESCRIPTION

Embodiments of the invention disclose a motion control system that automatically transitions between a first control with first gain values for positions in track segments and a second control with second gain values for position around segment junctions. Optimal motion performances are achieved through the entire track without the intervention of the user.

In some implementations, each track segment is divided into at least two zones. The segment includes a first zone or zones near one or more track segment junction and the remainder of the track segment is defined as a second zone. In a specific implementation, two groups of a proportional-integral-derivative (PID) controllers, PIDA and PIDB, are configured for optimized motion performances in the first zone(s) and the second zone, respectively. In a further implementation, a transition zone can be used to address hysteresis behavior when switching between the two PID controllers.

According to one embodiment of the invention, a transport system comprising a mover having an axis, and a track. The track includes a first track segment including a first coil, a second track segment adjacent to the first track segment and including a second coil, and a controller operative to drive the first coil to control movement of the mover along the first track segment towards the second track segment. The controller is further operative to define a first zone for the first track segment having a first set of controller gain values, define a second zone for the first track segment having a second set of controller gain values, drive the first coil to control movement of the mover with the first set of controller gain values when the location of the axis is in the first zone, and drive the first coil to control movement of the mover with the second set of controller gain values when the location of the axis is in the second zone.

According to another embodiment of the invention, a method to extend range of operations in an independent mover transport system. The transport system can include a mover having an axis, a track comprising a first track segment including a first coil, the track comprising a second track segment adjacent to the first track segment and including a second coil, and a controller operative to drive the first coil to control movement of the mover along the first track segment towards the second track segment. The method includes moving the mover along the track, defining a first zone for the first track segment having a first set of controller gain values, defining a second zone for the first track segment having a second set of controller gain values, driving the first coil to control movement of the mover with the first set of controller gain values when the location of the axis is in the first zone, and driving the first coil to control movement of the mover with the second set of controller gain values when the location of the axis is in the second zone.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIGS. 14A-F are partial side elevation views of a mover at various points entering a plurality of zones with differing controller gain values;

FIG. 18 is a graph representing a hysteresis band utilized with step transitions in gain values for a mover traveling along a track.

Figure 1:
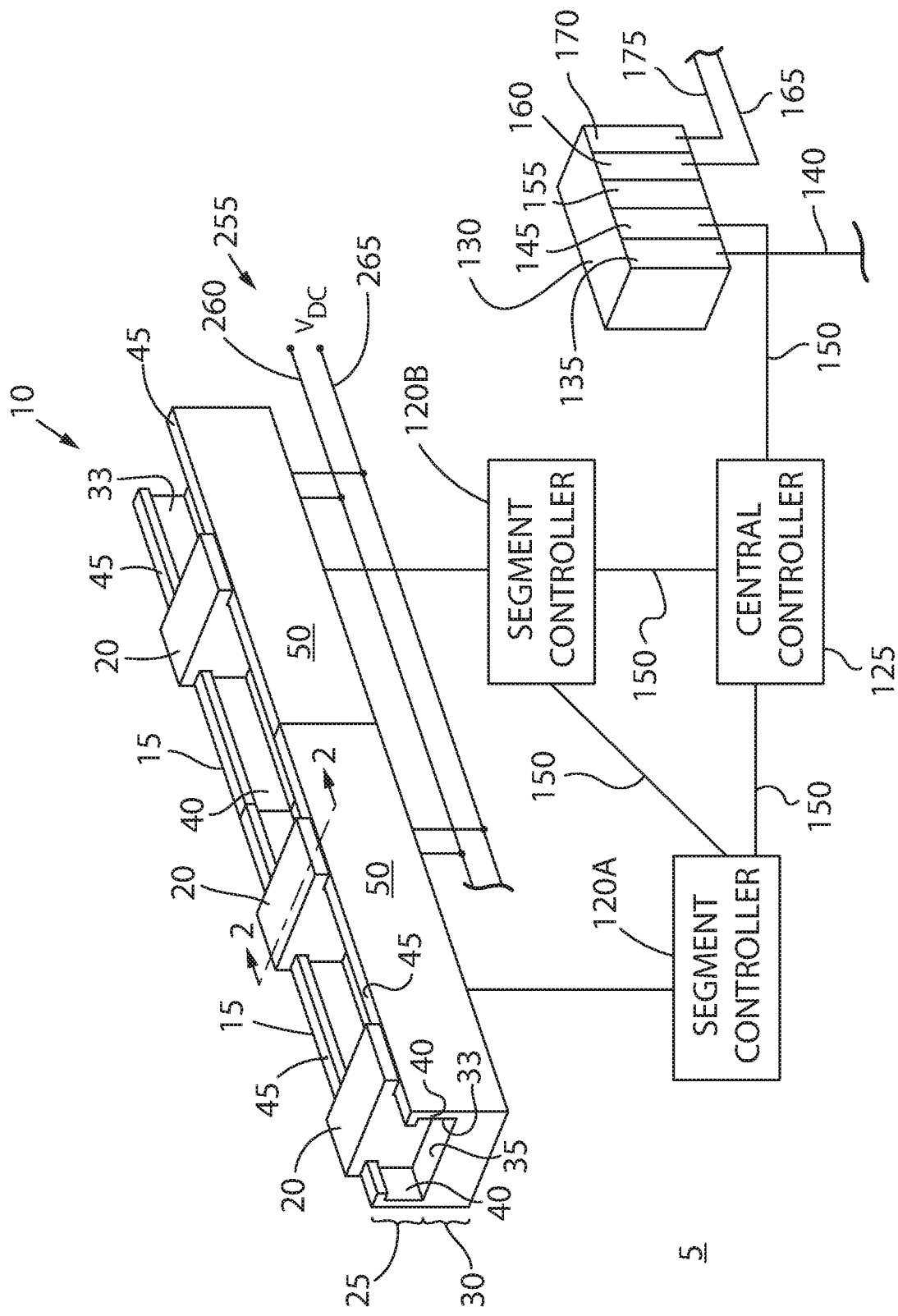
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIGS. 1-4, an exemplary transport system 5 (or simply "system 5") for moving articles or products includes a track 10 made up of multiple segments 15. According to the illustrated system 5, two segments 15 are joined end-to-end to define the overall track configuration. The illustrated segments 15 are both straight segments having generally the same length. It is understood that track segments of various sizes, lengths, and shapes may be connected together to form the track 10 without deviating from the scope of the invention. Track segments 15 may be joined to form a generally closed loop supporting a set of movers 20 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 20 will travel along the track and take various orientations according to the configuration of the track 10 and the relationships discussed herein may vary accordingly.

According to the illustrated system 5, each track segment 15 includes an upper portion 25 and a lower portion 30. The upper portion 25 is configured to carry the movers 20 and the lower portion 30 is configured to house the control elements. As illustrated, the upper portion 25 includes a generally u-shaped channel 33 extending longitudinally along the upper portion 25 of each segment. The channel 33 includes a bottom surface 35 and a pair of side walls 40, where each side wall 40 includes a rail 45 extending along an upper edge of the side wall 40. The bottom surface 35, side walls 40, and rails 45 extend longitudinally along the track segment 15 and define a guideway along which the movers 20 travel. According to one embodiment, the surfaces of the channel 33 (i.e., the bottom surface 35, side walls 40 and rails 45) are planar surfaces made of a low friction material along which movers 20 may slide. The contacting surfaces of the movers 20 may also be planar and made of a low friction material. It is contemplated that the surface may be, for example, nylon, Teflon®, aluminum, stainless steel and the like. Optionally, the hardness of the surfaces on the track segment 15 are greater than the contacting surface of the movers 20 such that the contacting surfaces of the movers 20 wear faster than the surface of the track segment 15. It is further contemplated that the contacting surfaces of the movers 20 may be removably mounted to the housing 50 of the mover 20 such that they may be replaced if the wear exceeds a predefined amount. According to still other embodiments, the movers 20 may include low-friction rollers to engage the surfaces of the track segment 15. Optionally, the surfaces of the channel 33 may include different cross-sectional forms with the mover 20 including complementary sectional forms. Various other combinations of shapes and construction of the track segment 15 and mover 20 may be utilized without deviating from the scope of the invention.

According to the illustrated system 5, each mover 20 is configured to slide along the channel 33 as it is propelled by a linear drive system. The mover 20 includes a body 55 configured to fit within the channel 33. The body 55 includes a lower surface 60, configured to engage the bottom surface 35 of the channel 33, and side surfaces 65 configured to engage the side walls 40 of the channel 33. The mover 20 further includes a shoulder 70 extending inward from each of the side surfaces 65. The shoulder 70 has a width equal to or greater than the width of the rail 45 protruding into the channel 33. A neck of the mover then extends upward to a top surface 75 of the body 55. The neck extends for the thickness of the rails such that the top surface 75 of the body 55 is generally parallel with the upper surface of each rail 45. The mover 20 further includes a platform 80 secured to the top surface 75 of the body 55. According to the illustrated embodiment, the platform 80 is generally square and the width of the platform 80 is greater than the width between the rails 45. The lower surface of the platform 80, an outer surface of the neck, and an upper surface of the shoulder 70 define a channel 85 in which the rail 45 runs. The channel 85 serves as a guide to direct the mover 20 along the track. It is contemplated that platforms or attachments of various shapes may be secured to the top surface 75 of the body 55. Further, various workpieces, clips, fixtures, and the like may be mounted on the top of each platform 80 for engagement with a product to be carried along the track by the mover 20. The platform 80 and any workpiece, clip, fixture, or other attachment present on the platform may define, at least in part, a load present on the mover 20.

Figure 2:
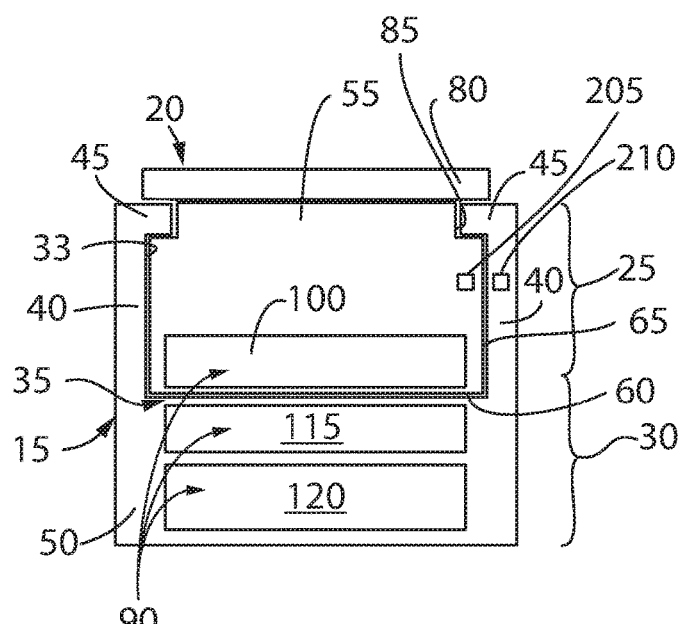
FIG. 2 is a sectional view of one embodiment of a mover and track segment included in the linear drive system taken at 2-2 of FIG. 1.
Figure 3:
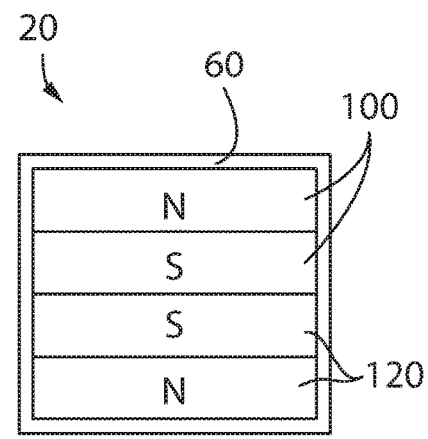
FIG. 3 is a bottom plan view of the exemplary mover of FIG. 2.

The mover 20 is carried along the track 10 by a linear drive system 90 (FIG. 2). The linear drive system 90, which may also be referred to in some implementations as a linear motor, is incorporated in part on each mover 20 and in part within each track segment 15. One or more drive magnets 100 are mounted to each mover 20. With reference to FIG. 3, the drive magnets 100 are arranged in a block on the lower surface of each mover. The drive magnets 100 include positive magnet segments 105, having a north pole, N, facing outward from the mover and negative magnet segments 110, having a south pole, S, facing outward from the mover. According to the illustrated system 5, two positive magnet segments 105 are located on the outer sides of the set of magnets and two negative magnet segments 110 are located between the two positive magnet segments 105. Optionally, the positive and negative motor segments may be placed in an alternating configuration. In still other constructions, a single negative magnet segment 110 may be located between the positive magnet segments 105. Various other configurations of the drive magnets 100 may be utilized without deviating from the scope of the invention.

Figure 5:
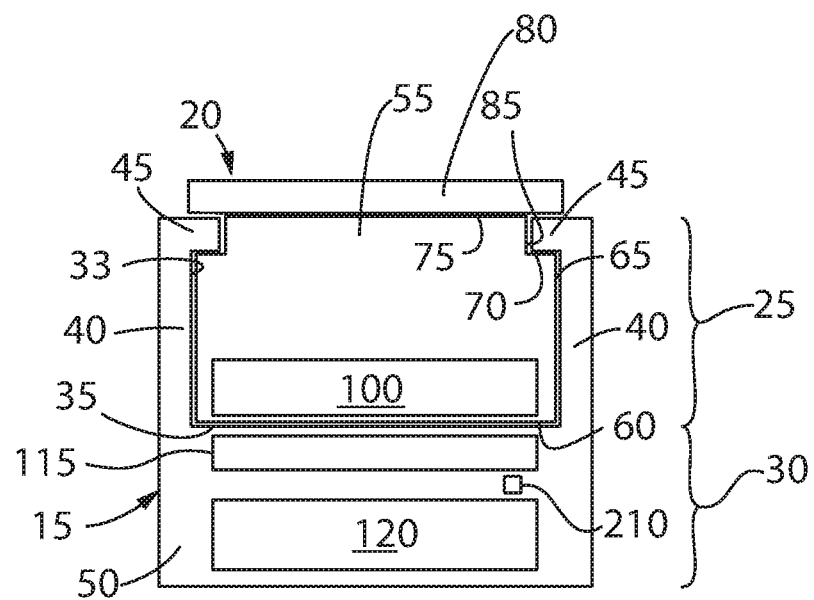
FIG. 5 is a sectional view of another embodiment of a mover and track segment included in the linear drive system taken at 2-2 of FIG. 1.
Figure 6:
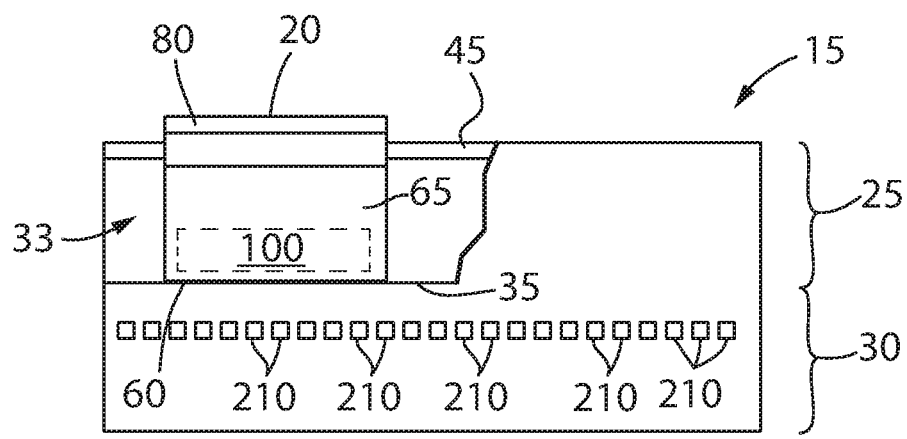
FIG. 6 is a partial side cutaway view of the mover and track segment of FIG. 5.

The linear drive system 90 further includes a series of coils 115 spaced along the length of the track segment 15. With reference also to FIGS. 5 and 6, the coils 115 may be positioned within the housing 50 for the track segment 15 and below the bottom surface 35 of the channel 33. The coils 115 are energized sequentially according to the configuration of the drive magnets 100 present on the movers 20. The sequential energization of the coils 115 generates a moving electromagnetic field that interacts with the magnetic field of the drive magnets 100 to propel each mover 20 along the track segment 15.

A segment controller 120 is provided within each track segment 15 to control the linear drive system and to achieve the desired motion of each mover 20 along the track segment 15. Although illustrated in FIG. 1 as blocks external to the track segments 15, the arrangement is to facilitate illustration of interconnects between controllers. As shown in FIG. 2, it is contemplated that each segment controller 120 may be mounted in the lower portion 30 of the track segment 15. Each segment controller 120 is in communication with a central controller 125 which is, in turn, in communication with an industrial controller 130. The industrial controller 130 may be, for example, a programmable logic controller (PLC) configured to control elements of a process line stationed along the track 10. The process line may be configured, for example, to fill and label boxes, bottles, or other containers loaded onto or held by the movers 20 as they travel along the line. In other implementations, robotic assembly stations may perform various assembly and/or machining tasks on workpieces carried along by the movers 20. The exemplary industrial controller 130 includes: a power supply 135 with a power cable 140 connected, for example, to a utility power supply; a communication module 145 connected by a network medium 150 to the central controller 125; a processor module 155; an input module 160 receiving input signals 165 from sensors or other devices along the process line; and an output module 170 transmitting control signals 175 to controlled devices, actuators, and the like along the process line. The processor module 155 may identify when a mover 20 is required at a particular location and may monitor sensors, such as proximity sensors, position switches, or the like to verify that the mover 20 is at a desired location. The processor module 155 transmits the desired locations of each mover 20 to a central controller 125 where the central controller 125 operates to generate commands for each segment controller 120.

Figure 7:
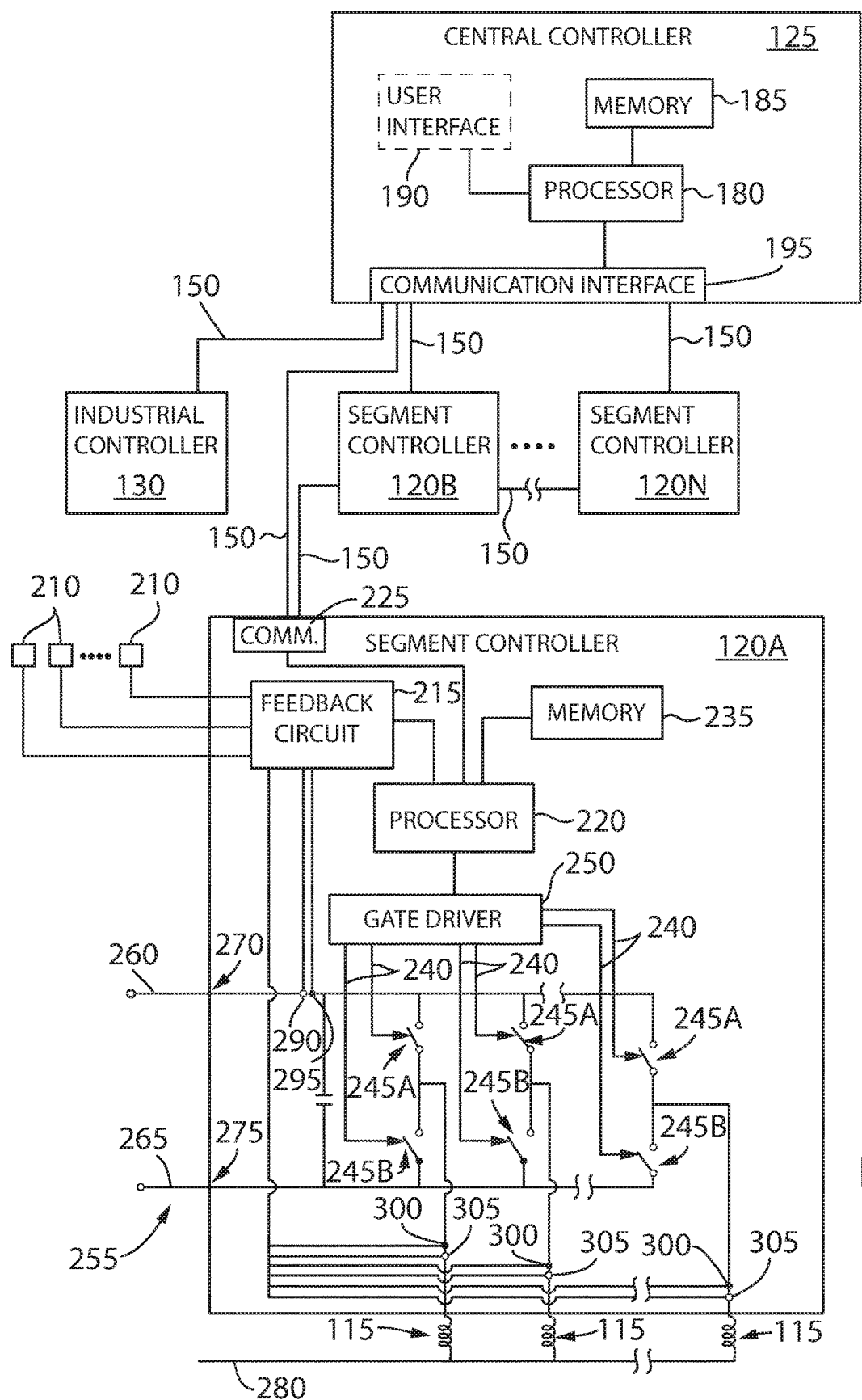
FIG. 7 is a block diagram representation of the exemplary control system of FIG. 1.

With reference also to FIG. 7, the central controller 125 includes a processor 180 and a memory 185. It is contemplated that the processor 180 and memory 185 may each be a single electronic device or formed from multiple devices. The processor 180 may be a microprocessor. Optionally, the processor 180 and/or the memory 185 may be integrated on a field programmable gate array (FPGA) or an application specific integrated circuit (ASIC). The memory 185 may include volatile memory, non-volatile memory, or a combination thereof. An optional user interface 190 may be provided for an operator to configure the central controller 125 and to load or configure desired motion profiles for the movers 20 on the central controller 125. Optionally, the configuration may be performed via a remote device connected via a network and a communication interface 195 to the central controller 125. It is contemplated that the central controller 125 and user interface 190 may be a single device, such as a laptop, notebook, tablet or other mobile computing device. Optionally, the user interface 190 may include one or more separate devices such as a keyboard, mouse, display, touchscreen, interface port, removable storage medium or medium reader and the like for receiving information from and displaying information to a user. Optionally, the central controller 125 and user interface may be an industrial computer mounted within a control cabinet and configured to withstand harsh operating environments. It is contemplated that still other combinations of computing devices and peripherals as would be understood in the art may be utilized or incorporated into the central controller 125 and user interface 190 without deviating from the scope of the invention.

The central controller 125 includes one or more programs stored in the memory 185 for execution by the processor 180. The central controller 125 receives a desired position from the industrial controller 130 and determines one or more motion profiles for the movers 20 to follow along the track 10. A program executing on the processor 180 is in communication with each segment controller 120 on each track segment via the network medium 150. The central controller 125 may transfer a desired motion profile to each segment controller 120. Optionally, the central controller 125 may be configured to transfer the information from the industrial controller 130 identifying one or more desired movers 20 to be positioned at or moved along the track segment 15, and the segment controller 120 may determine the appropriate motion profile for each mover 20.

A position feedback system provides knowledge of the location of each mover 20 along the length of the track segment 15 to the segment controller 120. According to the system 5 illustrated in FIGS. 2 and 4, the position feedback system includes one or more position magnets 205 mounted to the mover 20 and an array of sensors 210 spaced along the side wall 40 of the track segment 15. The sensors 210 are positioned such that each of the position magnets 205 is proximate to the sensor as the mover 20 passes each sensor 210. The sensors 210 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 210 outputs a feedback signal provided to the segment controller 120 for the corresponding track segment 15 on which the sensor 210 is mounted. The feedback signal may be an analog signal provided to a feedback circuit 215 which, in turn, provides a signal to the processor 220 corresponding to the magnet 205 passing the sensor 210.

According to another arrangement, illustrated in FIGS. 5 and 6, the position feedback system utilizes the drive magnets 100 as position magnets. Position sensors 210 are positioned along the track segment 15 at a location suitable to detect the magnetic field generated by the drive magnets 100. According to the illustrated embodiment, the position sensors 210 are located below the coils 115. Optionally, the position sensors 210 may be interspersed with the coils 115 and located, for example, in the center of a coil or between adjacent coils. According to still another embodiment, the position sensors 210 may be positioned within the upper portion 25 of the track segment 15 and near the bottom surface 35 of the channel 33 to be aligned with the drive magnets 100 as each mover 20 travels along the tracks segment 15.

Referring again to FIG. 7, the segment controller 120 also includes a communication interface 225 that receives communications from the central controller 125 and/or from adjacent segment controllers 120. The communication interface 225 extracts data from the message packets on the industrial network and passes the data to a processor 230 executing in the segment controller 120. The processor may be a microprocessor. Optionally, the processor 230 and/or a memory 235 within the segment controller 120 may be integrated on a field programmable gate array (FPGA) or an application specific integrated circuit (ASIC). It is contemplated that the processor 230 and memory 235 may each be a single electronic device or formed from multiple devices. The memory 235 may include volatile memory, non-volatile memory, or a combination thereof. The segment controller 120 receives the motion profile or desired motion of the movers 20 and utilizes the motion commands to control movers 20 along the track segment 15 controlled by that segment controller 120.

Each segment controller 120 generates switching signals to generate a desired current and/or voltage at each coil 115 in the track segment 15 to achieve the desired motion of the movers 20. The switching signals 240 control operation of switching devices 245 for the segment controller 120. According to the illustrated system 5, the segment controller 120 includes a dedicated gate driver module 250 which receives command signals from the processor 220, such as a desired voltage and/or current to be generated in each coil 115, and generates the switching signals 240. Optionally, the processor 220 may incorporate the functions of the gate driver module 250 and directly generate the switching signals 240. The switching devices 245 may be a solid-state device that is activated by the switching signal, including, but not limited to, transistors, thyristors, or silicon-controlled rectifiers.

According to the illustrated system 5, the track 10 receives power from a distributed DC voltage. A DC bus 255 receives a DC voltage, $V_{DC}$, from a DC supply and conducts the DC voltage to each track segment 15. The illustrated DC bus 255 includes two voltage rails 260, 265 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 15, it is contemplated that the DC bus 255 would extend within the lower portion 30 of the track segment. Each track segment 15 includes connectors to which either the DC supply or another track segment may be connected such that the DC bus 255 may extend for the length of the track 10. Optionally, each track segment 15 may be configured to include a rectifier section (not shown) and receive an AC voltage input. The rectifier section in each track segment 15 may convert the AC voltage to a DC voltage utilized by the corresponding track segment.

The DC voltage from the DC bus 255 is provided at the input terminals 270, 275 to a power section for the segment controller. A first voltage potential is present at the first input terminal 270 and a second voltage potential is present at the second input terminal 275. The DC bus 255 extends into the power section defining a positive rail 260 and a negative rail 265 within the segment controller 120. The terms positive and negative are used for reference herein and are not meant to be limiting. It is contemplated that the polarity of the DC voltage present between the input terminals 260, 265 may be negative, such that the potential on the negative rail 265 is greater than the potential on the positive rail 260. Each of the voltage rails 260, 265 are configured to conduct a DC voltage having a desired potential, according to application requirements. According to one arrangement, the positive rail 260 may have a DC voltage at a positive potential and the negative rail 265 may have a DC voltage at ground potential. Optionally, the positive rail 260 may have a DC voltage at ground potential and the negative rail 265 may have a DC voltage at a negative potential. According to still another arrangement, the positive rail 260 may have a first DC voltage at a positive potential with respect to the ground potential and the negative rail 265 may have a second DC voltage at a negative potential with respect to the ground potential. The resulting DC voltage potential between the two rails 260, 265 is the difference between the potential present on the positive rail 260 and the negative rail 265.

It is further contemplated that the DC supply may include a third voltage rail having a third voltage potential. According to one implementation, the positive rail 260 has a positive voltage potential with respect to ground, the negative rail 265 has a negative voltage potential with respect to ground, and the third voltage rail is maintained at a ground potential. Optionally, the negative voltage rail 265 may be at a ground potential, the positive voltage rail 260 may be at a first positive voltage potential with respect to ground, and the third voltage rail may be at a second positive voltage potential with respect to ground, where the second positive voltage potential is approximately one half the magnitude of the first positive voltage potential. With such a split voltage DC bus, two of the switching devices 245 may be used in pairs to control operation of one coil 115 by alternately provide positive or negative voltages to one the coils 115.

The power section in each segment controller 120 may include multiple legs, where each leg is connected in parallel between the positive rail 260 and the negative rail 265. According to the illustrated system 5, three legs are shown. However, the number of legs may vary and will correspond to the number of coils 115 extending along the track segment 15. Each leg includes a first switching device 245a and a second switching device 245b connected in series between the positive rail 260 and the negative rail 265 with a common connection between the first and second switching devices 245a, 245b. The first switching device 245a in each leg 221 may also be referred to herein as an upper switch, and the second switching device 245b in each leg 221 may also be referred to herein as a lower switch. The terms upper and lower are relational only with respect to the schematic representation and are not intended to denote any particular physical relationship between the first and second switching devices 245a, 245b. The switching devices 245 include, for example, power semiconductor devices such as transistors, thyristors, and silicon-controlled rectifiers, which receive the switching signals 240 to turn on and/or off. Each of switching devices may further include a diode connected in a reverse parallel manner between the common connection and either the positive or negative rail 260, 265.

The processor 220 also receives feedback signals from sensors providing an indication of the operating conditions within the power segment or of the operating conditions of a coil 115 connected to the power segment. According to the illustrated system 5, the power segment includes a voltage sensor 285 and a current sensor 290 at the input of the power segment. The voltage sensor 285 generates a voltage feedback signal and the current sensor 290 generates a current feedback signal, where each feedback signal corresponds to the operating conditions on the positive rail 260. The segment controller 120 also receives feedback signals corresponding to the operation of coils 115 connected to the power segment. A voltage sensor 300 and a current sensor 305 are connected in series with the coils 115 at each output of the power section. The voltage sensor 300 generates a voltage feedback signal and the current sensor 305 generates a current feedback signal, where each feedback signal corresponds to the operating condition of the corresponding coil 115. The processor 230 executes a program stored on the memory device 235 to regulate the current and/or voltage supplied to each coil and the processor 230 and/or gate driver module 250 generates switching signals 240 which selectively enable/disable each of the switching devices 245 to achieve the desired current and/or voltage in each coil 115. The energized coils 115 create an electromagnetic field that interacts with the drive magnets 100 on each mover 20 to control motion of the movers 20 along the track segment 15.

Figure 8:
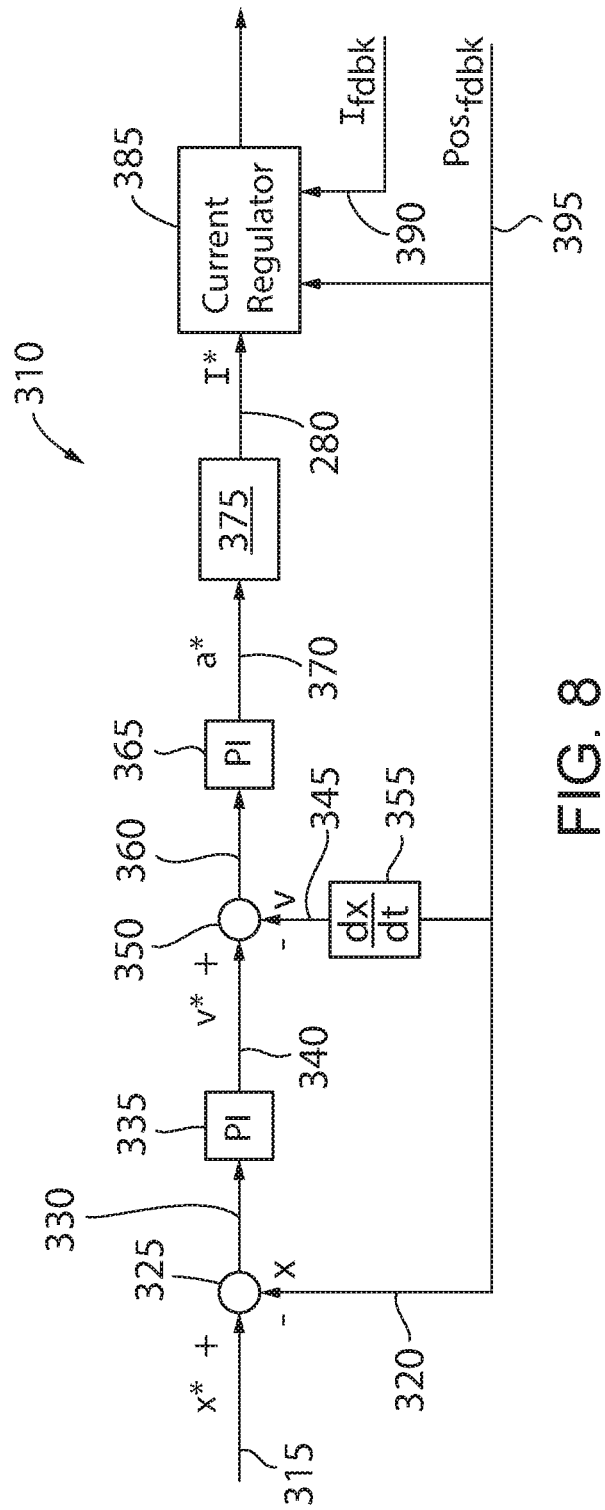
FIG. 8 is an exemplary control module included for execution on a segment controller according to one embodiment of the invention.

In one operation, each track segment 15 is configured to control operation of each mover 20 present on the track segment 15. The segment controller 120 receives a command signal corresponding to the desired operation of each mover 20 and controls the current output to each coil 115 to achieve the desired operation. With reference to FIG. 8, one implementation of a control module 310 executable by the segment controller 120 is illustrated. The control module 310 receives a position command signal (x*) 315 as an input. The position command signal (x*) is compared to a position feedback signal (x) 320 at a first summing junction 325. A position error signal 330 is output from the first summing junction 325 and input to a position loop controller 335. According to FIG. 8, the position loop controller 335 includes a proportional and an integral (PI) controller. Optionally, the position loop controller 335 may be just a proportional (P) controller or further include a derivative (D) controller. Each of the proportional (P), integral (I), and/or derivative (D) controllers of the position loop controller 335 includes a controller gain value. The controller gain values are commonly referred to as a proportional gain (Kpp), integral gain (Kpi), and a derivative gain (Kpd). The output of the position loop controller 335 is a velocity reference signal (v*) 340.

The velocity reference signal (v*) 340 is compared to a velocity feedback signal (v) 345 at a second summing junction 350. The velocity feedback signal (v) 345 is generated by a derivative block 355 acting on the position feedback signal 320. A velocity error 360 signal is output from the second summing junction 350 and input to a velocity loop controller 365. According to FIG. 8, the velocity loop controller 365 includes a proportional and an integral (PI) controller. Optionally, the velocity loop controller 365 may be just a proportional (P) controller or further include a derivative (D) controller. Each of the proportional (P), integral (I), and/or derivative (D) controllers of the velocity loop controller 365 includes a controller gain value. The controller gain values are commonly referred to as a proportional gain (Kvp), integral gain (Kvi), and a derivative gain (Kvd). The output of the velocity loop controller 365 is an acceleration reference signal (a*) 370.

The acceleration reference signal 370 is passed through an additional gain and filter block 375. The gain and filter block 375 may include one or more filters to remove unwanted components from the control system. For example, a low pass filter may be provided to attenuate undesirable high frequency components and a notch filter to attenuate specific frequency components having an undesirable effect on the controlled mechanical load. The gain and filter block 375 may also include an inertial gain factor or a torque constant gain factor. An inertial gain factor converts the acceleration reference to a torque reference and the torque constant gain factor converts a torque reference to a current reference, I*, 380. Optionally, gain factors may be incorporated into a single gain or incorporated with filter or controller gains. Combining the inertial and/or torque constant gain factors together or with another controller gain or with the filter gain reduces the real time computational burden imposed on the segment controller 120.

The current reference, I*, 380 is, in turn, passed to a current regulator 385, which controls the current supplied to each coil 115 on the track segment. The current regulator 385 receives current feedback signals from the current sensors 305 and position feedback information identifying the measured position of each mover 20 or a compensated position of each mover, as will be discussed in more detail below. Because a mover 20 may span multiple coils 115, the current regulator 385 determines an appropriate current for each coil 115 to produce the force desired to control the mover as indicated by the current reference, I*, 380 and determines a resultant current desired for each coil 115. The current regulator 385 uses the current and position feedback 390 and 395 information to regulate the current to each coil 115, accordingly.

The output of the current regulator 385 is provided as an input to the gate driver module 250. With reference again to FIG. 7, the gate driver module 250 converts the input to a desired output voltage having a variable amplitude and frequency. Having determined the desired output voltage required to produce the commanded input, the gate driver module 250 generates the gating signals 240 used by pulse width modulation (PWM) or by other modulation techniques to control the switching elements 245A, 245B to produce the desired currents in each coil 115, resulting in the desired motion for each mover 20. As illustrated in FIG. 8 and as discussed above, the control module 310 utilizes position feedback information to regulate the current output to each coil 115.

Figure 9:
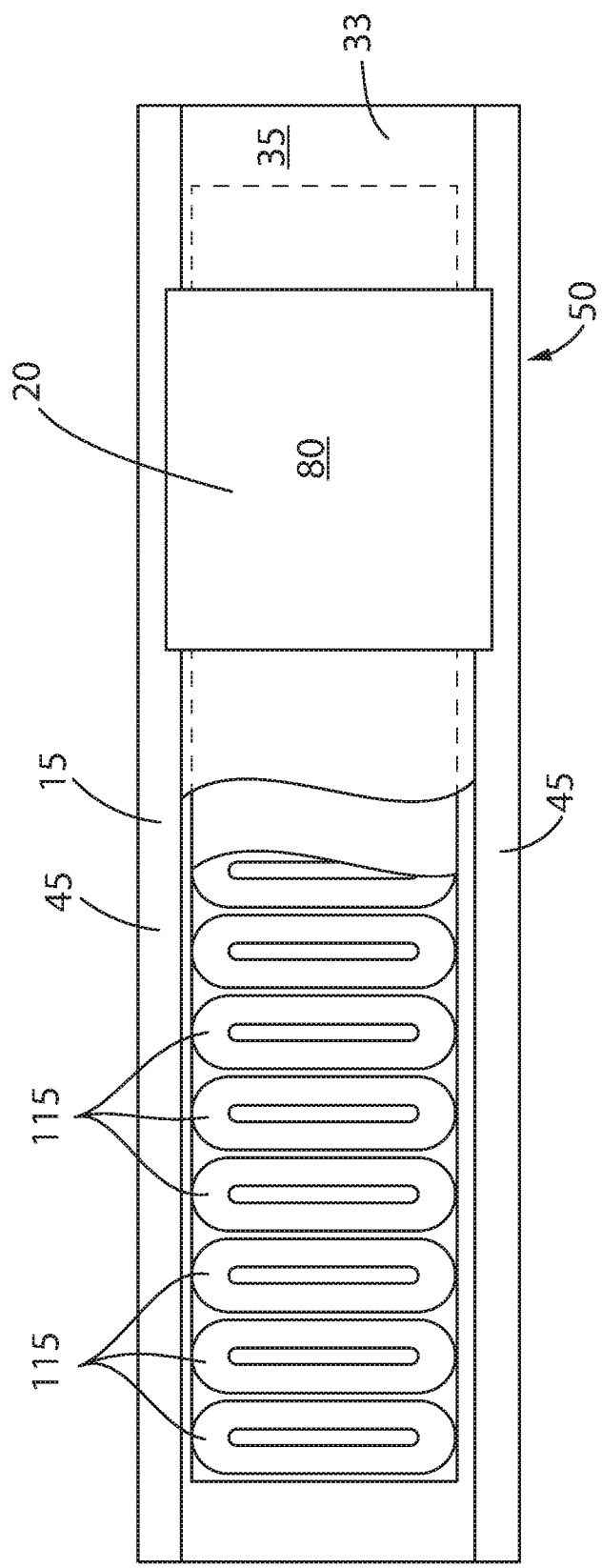
FIG. 9 is a partial top cutaway view of the mover and track segment of FIG. 2.
Figure 10:
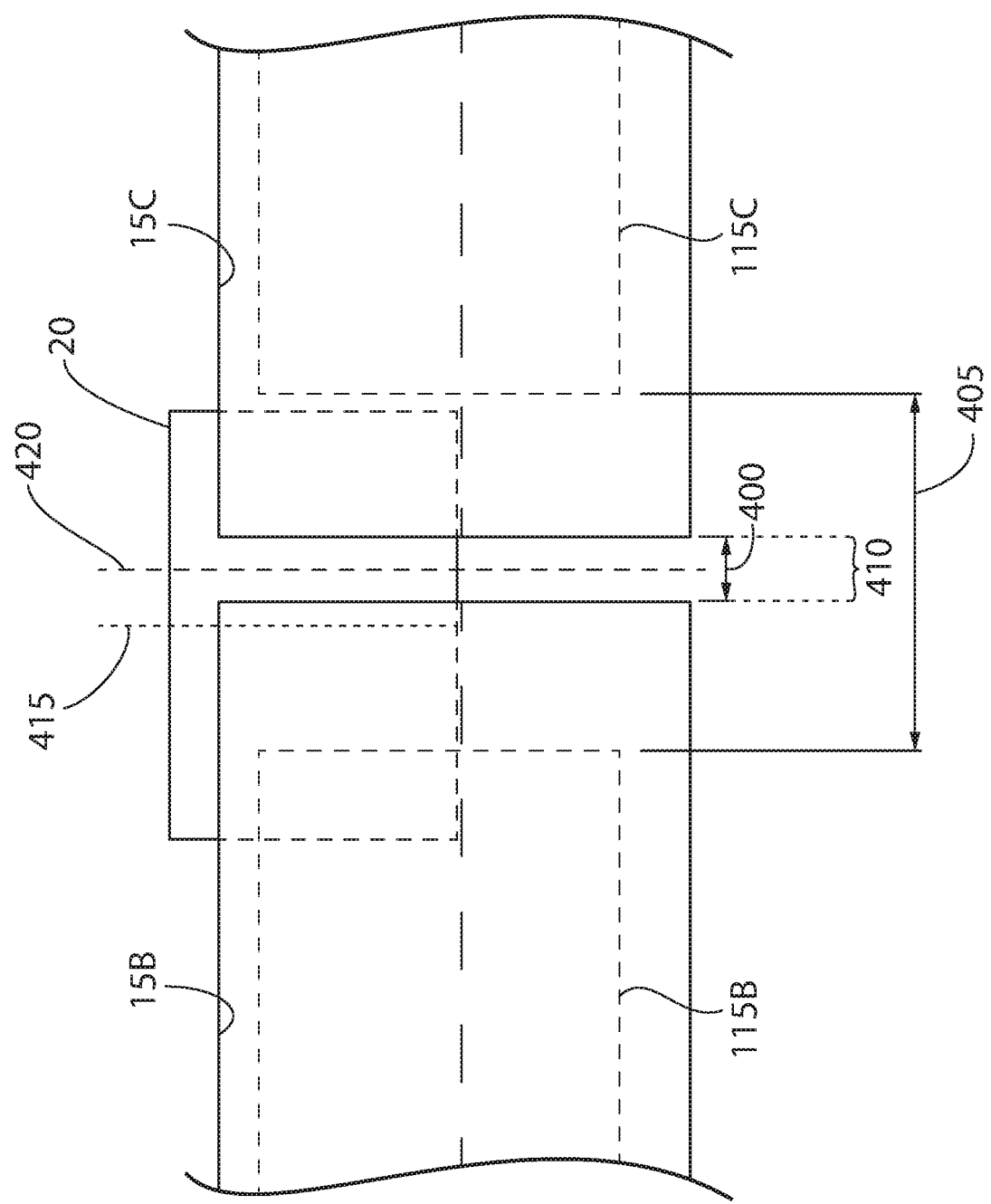
FIG. 10 is partial side elevation view of a mover crossing a junction between track segments.

Turning next to FIGS. 9 and 10 and according to one construction of the system 5, each track segment 15 is one meter (1 m) in length. As a mover 20 travels along the track, each track segment 15 is defined within the central controller as having a position that corresponds to the one meter length. For example, a first track segment 15 is assigned the position from zero to one meter. A second track segment 15 is assigned the position from one meter to two meters. A third track segment 15 is assigned the position from two meters to three meters and so on. Ideally, a second end of the leading track segment 15C is positioned tightly against a first end of the following track segment 158 to provide a smooth transition between track segments. However, as a result of tolerances, the gaps 400 exist among the track segments 15. The gaps 400 may be, for example, only one millimeter or may vary from several millimeters up to tens of millimeters. Similarly, the gaps 400, for example, may purposely vary to much larger distances to save on system 5 cost. These gaps 400 introduce motion noise within the transport system 5. Motion noise refers to a disturbance in the movement of a mover 20 along the track 10 of the transport system 5.

As just described, motion noise may be caused by a mechanical imperfection. Another motion noise may be caused by an electro-magnetic imperfection. For example, another potential source of motion noise is a linear drive system gap 405 between the coils 115B and 115C of the two track segments 15B and 15C. Ideally, the ends of the coils 115 of the linear drive systems 90 are positioned tightly to the ends of the track segments 15. However, similar to mechanical gap tolerances, the ends of the coils 115 may not be positioned tightly to the ends of the track segments 15. The linear drive system gap 405 results in electro-magnetic imperfection, thereby providing additional motion noise. Additionally, the linear drive system gap 405 results in a loss of thrust applied to the mover 20 as it transitions between adjacent track segments 15 since there are fewer coils 115 present under the movers magnet array 100 than when the mover 20 is positioned fully over the drive coils 115 and a subsequently reduced electromagnetic force present in the gap to interact with the magnet array 100.

Motion of a mover 20 as it crosses junction 410 will be discussed with respect to an exemplary mover 20 and track segments 15B and 15C illustrated in FIGS. 10 and 11A-11C. It will be assumed that the first track segment 15B is assigned a location along the track 10 of one meter to two meters (1-2 m) and the second track segment 15C assigned a location along the track 10 of two meters to three meters (2-3 m). A position gap 400 exists at the junction 410 between the two track segments 15B and 15C. An electromagnetic gap 405 exists between the two sets of coils 115B and 115C.

Figure 11A:
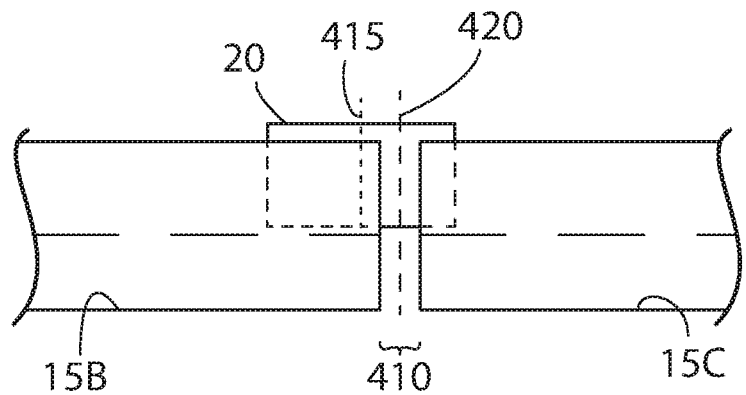
FIGS. 11A-C are partial side elevation views of a mover crossing the junction between track segments at various points in time.
Figure 11B:
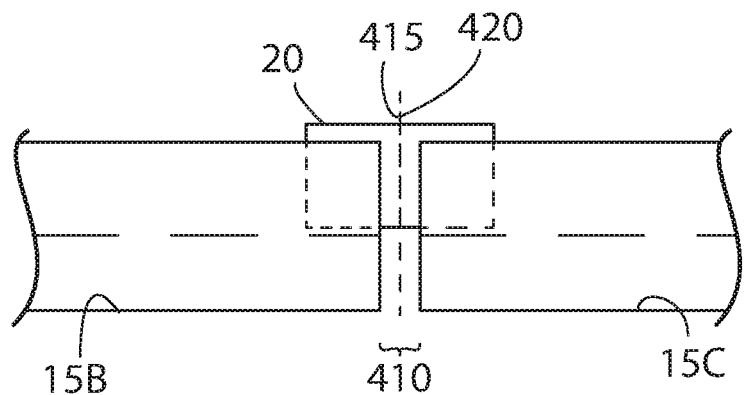
Figure 11C:
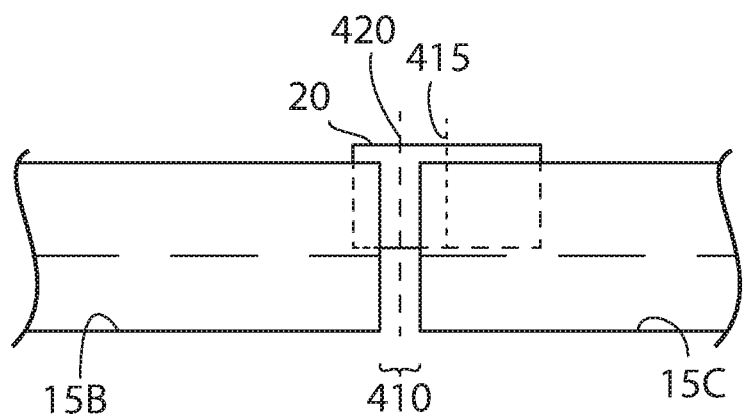

A center axis 415 of the mover 20 and a center line 420 of the junction 410 are each illustrated in FIGS. 10 and 11A-11C. As the mover 20 travels from the first segment 15B to the second segment 15C, the center axis 415 of the mover 20 is initially located over the first segment 15B while a forward edge of the mover 20 crosses the junction 410 and is located on the second segment 15B, as shown in FIG. 11A. At the midpoint in the crossing, as shown in FIG. 11B, the center axis 415 of the mover 20 is aligned with the center line 420 of the junction 410 between the two segments 15B, 15C, and an equal portion of the mover 20 is located on each segment. As the mover 20 continues across the junction 410, the center axis 415 and a greater portion of the mover 20 is present on the second segment 15B and the trailing edge of the mover 20 remains of the first segment 15B. Eventually, the mover 20 continues moving until the entire mover 20 is located over the second segment 15B.

As a mover 20 approaches the gap 405, the segment controller 120 for the first track segment 15B initially controls current output to coils 115B of the first track segment 15B for controlling motion of the mover 20. The first segment 15B remains responsible for control of the mover 20 until the mover reaches the middle point shown in FIG. 11B. As the center axis 415 of the mover 20 crosses the center line 420 of the junction 410, control of the mover 20 is passed from the segment controller 120 of the first segment 15B to the segment controller 120 of the second segment 15C.

Figure 4:
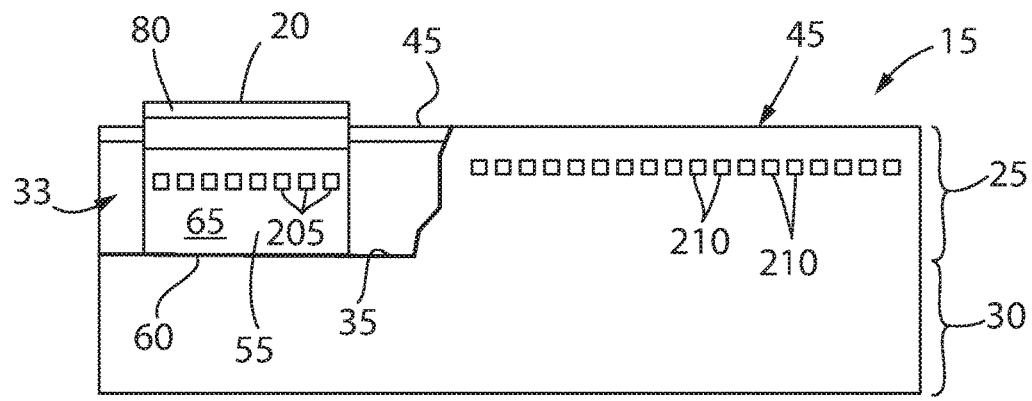
FIG. 4 is a partial side cutaway view of the mover and track segment of FIG. 2.

In order for control of the mover 20 to transition between segments, both segments 15B and 15C must have knowledge of the position of the mover 20. As illustrated in FIG. 4, the mover 20 includes an array of position magnets 205 spaced along the length of the mover 20. The center axis 415 of the mover 20 is positioned over the first segment 15B, and therefore, the segment controller in the first segment 15B is responsible for control of the mover 20. A first portion of the position magnets 205 in the magnet array are located over the first segment 15B and a second portion of the position magnets 205 in the magnet array are located over the second segment 15C. The position sensors 210 (FIG. 4), spaced along the length of both segments are able to detect the position magnets 205 located over the respective segment. The segment controller 120 in both segments receives position feedback signals from those position sensors 210 that are able to detect one of the position magnets 205 and generates a value for the position of the mover 20 responsive to those position feedback signals.

Referring back to FIG. 8, each segment controller 120 may use a PID controller for controlling the mover 20 while the mover 20 is within the region 425 or on the segment 15. The controller gain values for the PID controller are commonly referred to as a proportional gain (Kpp), integral gain (Kpi), and derivative gain (Kpd). Other control techniques and other controller gain values can be used in alternative to or in combination with the PID gain values.

Figure 12A:
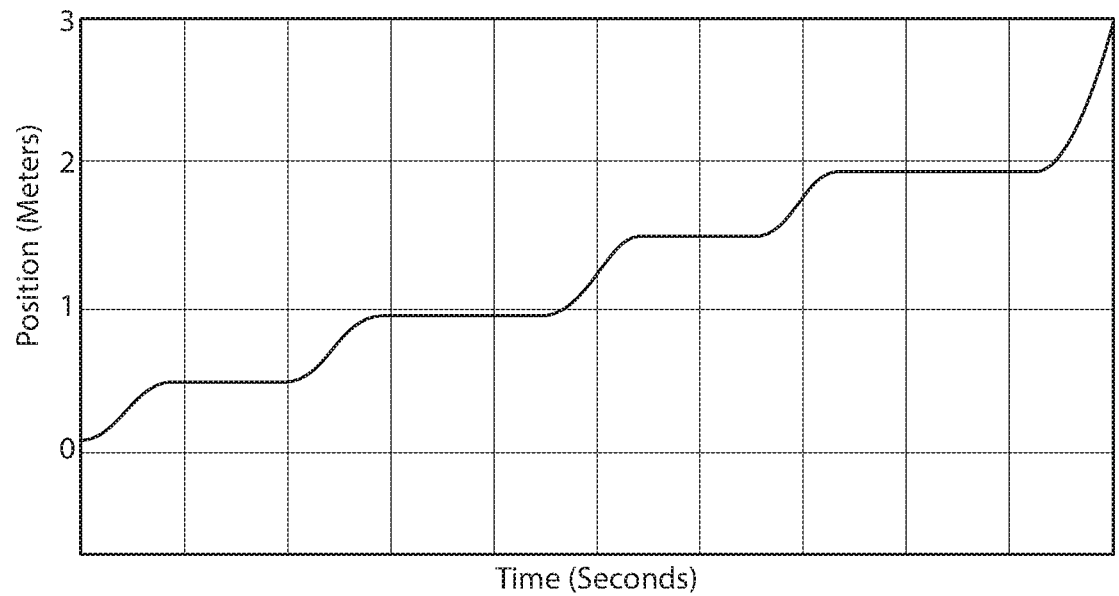
FIG. 12A is a graph representing movement of a mover over three track segments.
Figure 12B:
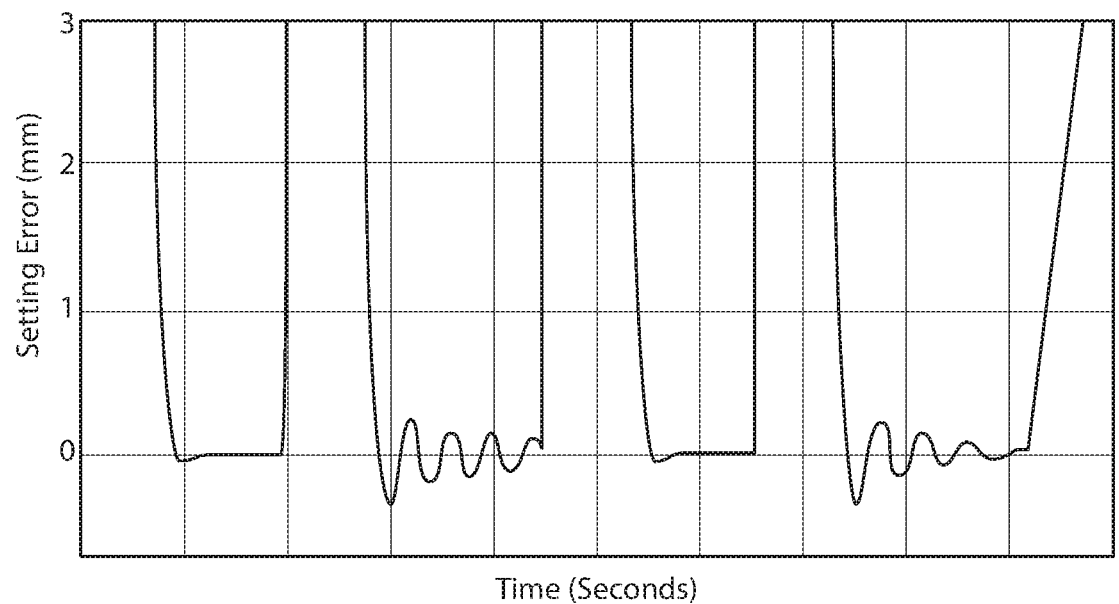
FIG. 12B is a graph representing settlement error for an optimized in track segment controller.

Now with reference to FIG. 12A, the graph shows a mover 20 moving through a three track system from zero to three meters. The track 10 has four stops. The first stop is at 0.5 meters, the second stop is at 0.95 meters, the third stop is at 1.5 meters, and the fourth stop is at 1.95 meters. Using a first set of gain values optimized for in-section movement and settling, the resulting settling error is shown in FIG. 12B. As shown in FIG. 12B, track portions around the junctions 410 (which fall within the linear drive system gap 405) are typically defined as "no-station zones" due to changes in thrust and reluctance force pattern. This results in limiting flexibility in track system design and increasing system cost and floor space.

In alternative to using the first set of gain values for FIG. 12B, a second set of gain values can be optimized for over junction 410 settling. Performing the same movements as FIG. 12A, the settling error for a mover 20 is shown in FIG. 12C for the second set of gain values being optimized for over the junction settling. The result is a significant improvement for settling in track portions around the junction 410, but also an introduction of significant settling issues in the middle of each track section 15. Accordingly, the solution in FIG. 12C is worse than the problem in FIG. 12B since the linear drive system gaps 405 are typically a small portion of the track segments 15 compared to the portions of the track segments that include coils 115.

In embodiments of the invention, a transport system 5 automatically transitions between controller gain values (e.g., PID gain values) for positions in segments 15 and around junctions 410. Optimal motion performances are achieved through the entire track 10 without the intervention of the user. A center axis 415 of the mover 20 and a center line 420 of the junction 410 are each illustrated in 14A-14F. As the mover 20 travels from the first segment 15B to the second segment 15C, a plurality of zones are defined for each segment 15B and 15C. When the center axis 415 of the mover 20 is located in the first zone 430 (FIG. 14A), the segment controller 120 of segment 15B uses a first set of controller gain values for the first zone 430. When the center axis 415 of the mover 20 is located in the third zone 440 (FIG. 14F), the segment controller 120 of segment 15C also uses the first set of controller gain values the first zone 430. However, before proceeding further, it should be noted that the set of controller gain values in the third zone 440 may alternatively be different from the set of controller gain values in the first zone 430. Using unique controller gain values for each zone 430 and 440 leads to a more complex solution, while using the same controller gain values in zones 430 and 440 leads to a more simplistic solution. For the remainder of this disclosure, it will be assumed that the controller gain values for zone 440 will be the same as the controller gain values for zone 430.

Figure 13:
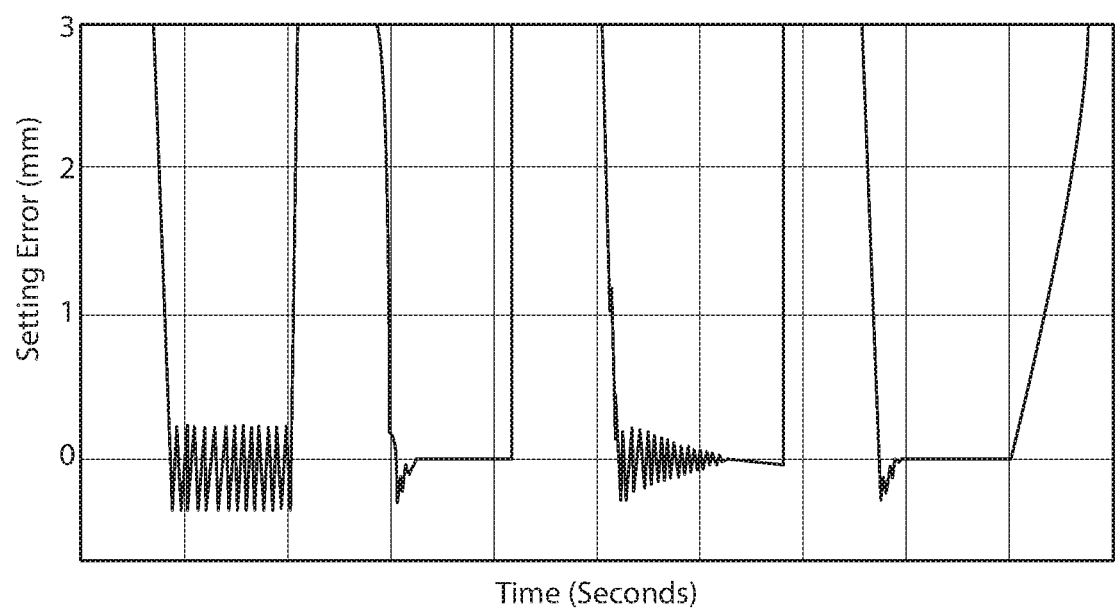
FIG. 13 is a graph representing settlement error for an optimized near junction controller.

When the center axis 415 of the mover 20 is located in the second zone 435 (FIGS. 14B-14E), the segment controllers 120 of segments 15B and 15C use the second set of gain values for zone 435. The second zone 435 may be a different size from the linear drive system gap 405, but may also be the same size as the linear drive system gap 405. Whether a coil 115 of segment 15B and/or 15C is energized can depend on the implementation discussed with reference to FIGS. 11A-11C. Regardless, embodiments of the present invention use at least two different controller gain values for each segment 15. The first set of controller gain values for zone 430 (and zone 440) correspond to in section movement and settling, as discussed with FIG. 12B. The second set of controller gain values for zone 435 correspond to over junction 410 movement and settling, as discussed with FIG. 13.

Figure 15:
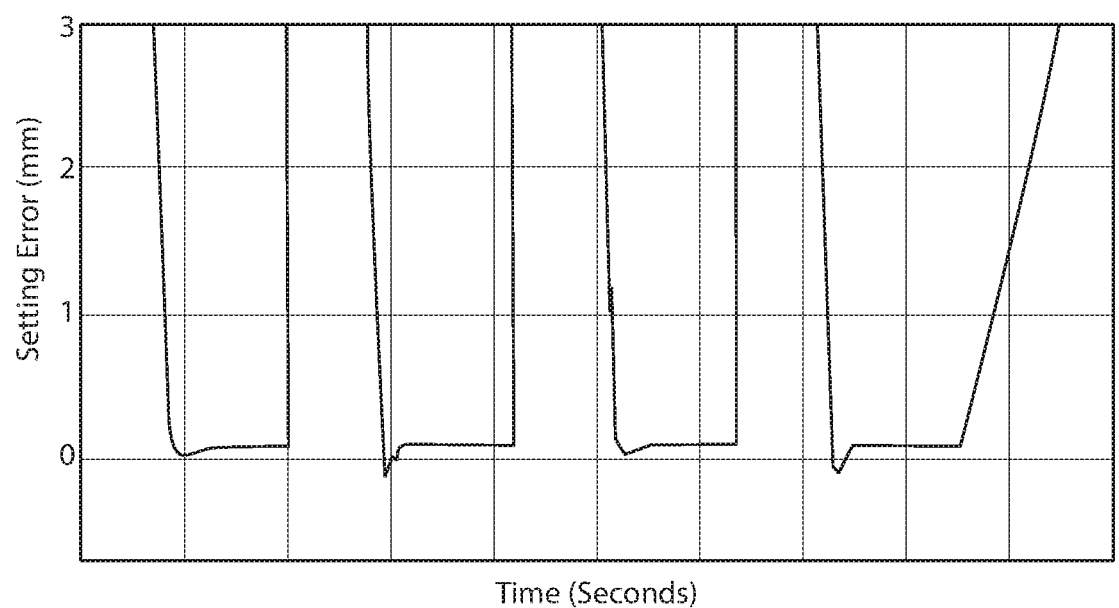
FIG. 15 is a graph representing settlement error for an optimized multi-zone controller.

FIG. 15 provides the results of a test for a mover 20 performing the same movements in FIG. 12A, however the track 10 includes multiple zoned controllers. More specifically, each segment controller 120 includes a first zone operation optimized for in-segment operation and a second zone operation optimized for an in-junction operation (i.e., operation similar to what was discussed for FIG. 14). By the automatic application of multiple controllers (e.g., PID controllers with different PID gain values) optimized for specified zones in the track, consistent motion performances can be achieved over stations both in-segment and in-gap. FIG. 15 show the settling error for a mover 20 of an improved system incorporating the invention.

Figure 16A:
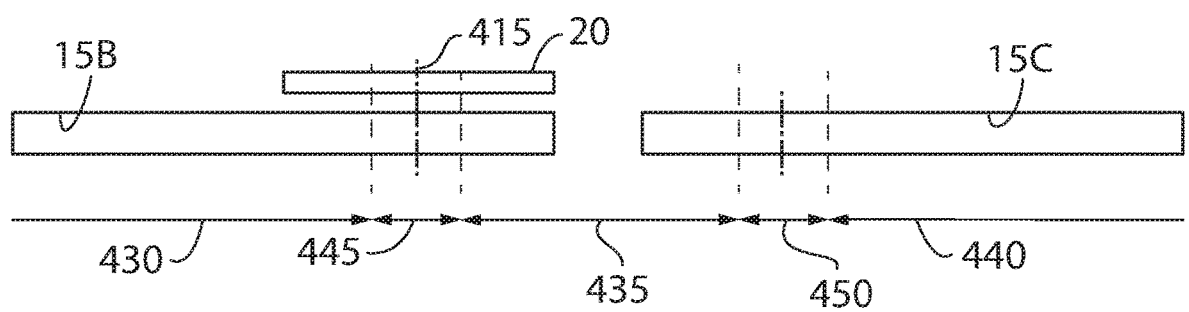
FIG. 16A-B are partial side elevation views of a mover at various points in a plurality of zones, including transition zones, with differing controller gain values.
Figure 16B:
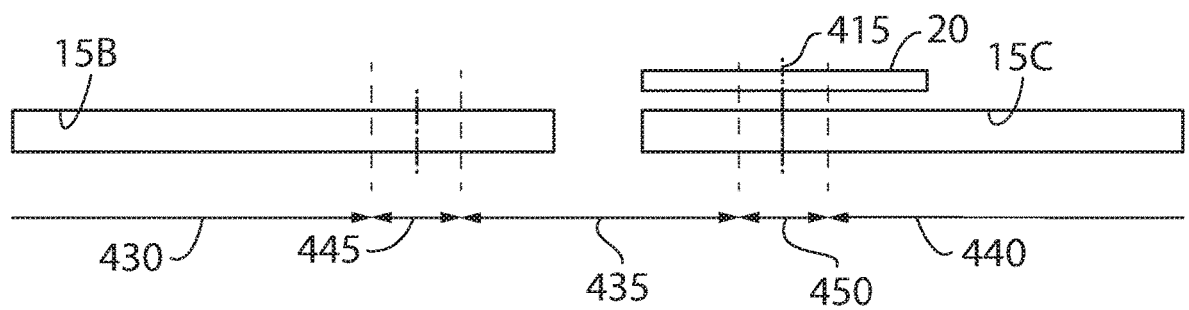

In the further implementation shown in FIG. 16, another zone, referred to herein as a transition zone 445, is included between zones 430 and 435. Instantaneous transitions, as described in connection with FIGS. 14A-F, provide a significant improvement over the prior art, as shown in FIG. 15. However, instantaneous transitions can lead to bad behavior at positions where the transition occurs. This can be seen in FIG. 15 where some motion noise still occurs when the mover is first settling, particularly when the station is near the gap 405. For FIGS. 16A and 16B, a second transition zone 450 is included between zones 435 and 440. When the mover 20 is in the transition zone 445, the segment controller 120 for segment 15B transitions between the controller gain values of zone 430 and the gain values of zone 435. When the mover is in the transition zone 450, the segment controller 120 for segment 15C transitions between the controller gain values of zone 435 and the gain values of zone 440. The transition may be linear or nonlinear.

Figure 17:
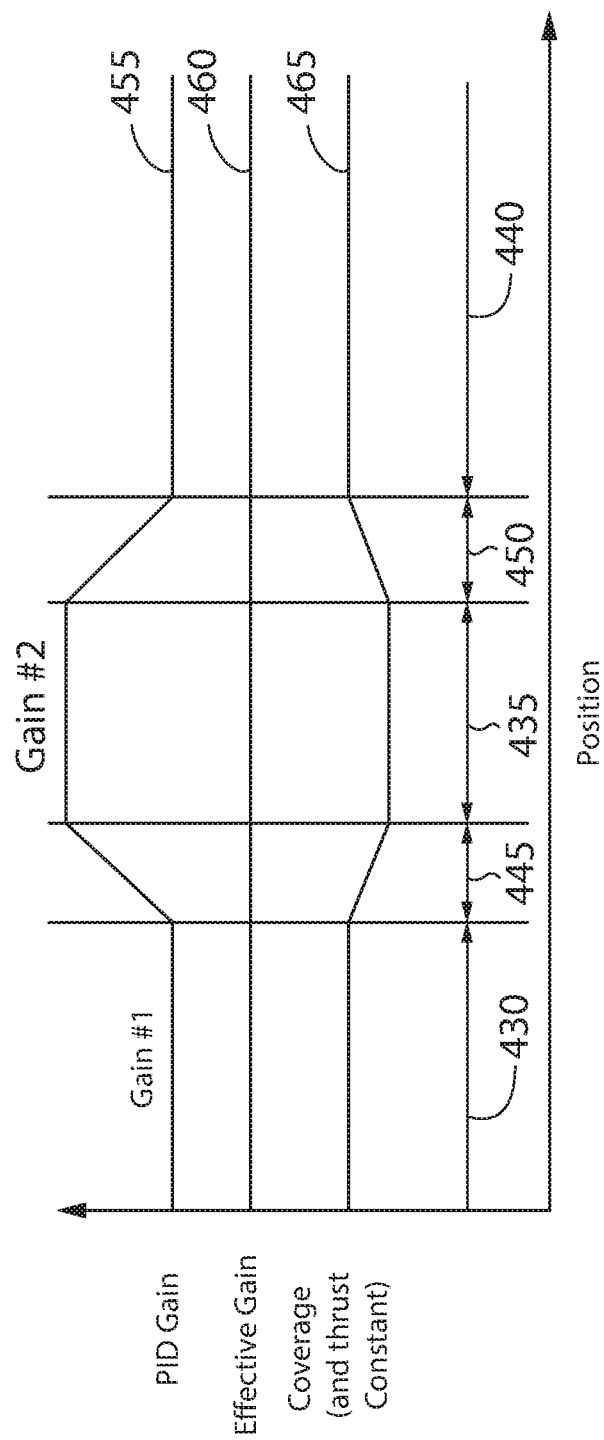
FIG. 17 is a graph representing a linear controller gain transition for a mover moving from a first track segment to a second track segment.

FIG. 17 represent controller gain values 455 for a PID gain linearly transitioning from a first gain value to a second gain value. The segment controller 120 only needs to know the first gain value and the second gain value and can linearly interpolate between the two values based on position. The effective gain 460 and the coverage (and thrust constant) 465 resulting from the controller gain values 455, in one implantation, is also shown in FIG. 17. The coverage, and resultant thrust constant, decrease as the mover travels over the linear drive system gaps 405. However, by increasing the controller gain values 455, the effective gain in the controller remains approximately constant. In some cases, it is desirable to slowly (or quickly) increase bandwidth. As a result, some transitions for controller gain values may be non-linear (e.g., squared).

In another implementation, the transition zone may alternatively be a hysteresis zone 470. FIG. 18 represents controller gain values 475 for two PID gains as a mover moves between two zones 430 and 435. Using a hysteresis zone 470 helps to prevent gain values flipping back and forth at the transition location since the mover 20 must travel back or forth a distance before flipping to the other value. In a specific implementation, the hysteresis zone 470 is less than one-half the length of the smaller of zones 430 and 435. When the axis 415 of the mover 20 is within zone 430, but not zone 470, then the controller gain values of zone 430 are used. When the axis 415 of the mover 20 is within zone 435, but not zone 470, then the controller gain values of zone 435 are used. If the mover 20 is moving under the controller gain values of zone 430, then the controller gain values only switch to the controller gain values of zone 435 when the axis 415 of mover 20 moves though zone 470 into the neighboring zone 435. If the mover 20 is moving under the controller gain values of zone 435, then the controller gain values only switch to the controller gain values of zone 430 when the axis 415 of mover 20 moves though zone 470 into the neighboring zone 430.

Accordingly, embodiments of the invention help reduce the cost of ownership and improve design flexibility for motion control systems by eliminating "no-station zones." This is done by providing more consistent motion performance throughout the system 5, resulting in flexibility to place more working stations over the track and reducing machine floor space with closer station spacing. Higher throughput is also possible due to shorter travel distance between stations is possible. Alternatively, a system can implement larger motor gaps which will lower system cost.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A transport system comprising:
   a mover having an axis; and
   a track comprising:
      a first track segment including a first coil;
      a second track segment adjacent to the first track segment and including a second coil; and
      a controller having a memory operative to store a first set of controller gain values and a second set of controller gain values, wherein the controller is operative to drive the first coil to control movement of the mover along the first track segment towards the second track segment, the controller being further operative to:
         define a first zone for the first track segment corresponding to the first set of controller gain values,
         define a second zone for the first track segment corresponding to the second set of controller gain values,
         generate a current reference with a control module using the first set of controller gains when the location of the axis is in the first zone,
         drive the first coil using the current reference generated by the control module with the first set of controller gains to control movement of the mover when the location of the axis is in the first zone,
         generate the current reference with the control module using the second set of controller gains when the location of the axis is in the second zone, and
         drive the first coil using the current reference generated by the control module with the second set of controller gains to control movement of the mover when the location of the axis is in the second zone.

2. The transport system of claim 1, wherein the mover has a body with a center, and the axis is defined at the center of the body.

3. The transport system of claim 1, wherein the controller includes a proportional-integral-derivative (PID) control module, wherein the first set of controller gain values includes a first proportional gain value, a first integral gain value, and a first derivative gain value, and wherein the second set of controller gain values includes a second proportional gain value, a second integral gain value, and a second derivative gain value.

4. The transport system of claim 3, wherein the controller is further operative to:
   define a transition zone for the first track segment, the transition zone being located between the first zone and the second zone,
   interpolate a third set of controller gain values using the first set of controller gain values and the second set of controller gain values when the location of the axis is in the transition zone, the interpolation of the third set being based on the position of the axis,
   generate the current reference with the control module using the third set of controller gains when the location of the axis is in the transition zone, and
   drive the first coil using the current reference generated by the control module with the third set of controller gains to control movement of the mover when the location of the axis is in the transition zone.

5. The transport system of claim 4, wherein the interpolation of the third set is a linear interpolation between the first set of controller gain values and the second set of controller gain values based on the position of the axis.

6. The transport system of claim 1, wherein the controller is further operative to
   define a hysteresis zone for the first track segment,
   when the mover is moving under the first set of controller gain values, then the first controller gain values switch to the second set of controller gain values when the axis of mover moves though hysteresis zone into the second zone, and
   when the mover is moving under the second set of controller gain values, then the second controller gain values switch to the first set of controller gain values when the axis of mover moves though hysteresis zone into the first zone.

7. The transport system of claim 1, wherein the first track segment includes the controller.

8. The transport system of claim 7, wherein the track includes a third track segment adjacent to the second track segment opposite the first track segment, wherein the second track segment includes a second controller having a second memory operative to store another first set of controller gain values and another second set of controller gain values, wherein the second controller is operative to drive the second coil to control movement of the mover along the second track segment towards the third track segment, the second controller being further operative to:
   define a first zone for the second track segment corresponding to the other first set of controller gain values,
   define a second zone for the second track segment corresponding to the other second set of controller gain values,
   generate a second current reference with a second control module using the other first set of controller gains when the location of the axis is in the first zone for the second track segment,
   drive the second coil using the second current reference generated by the second control module with the other first set of controller gains to control movement of the mover when the location of the axis is in the first zone for the second track segment, generate the second current reference with the second control module using the other second set of controller gains when the location of the axis is in the second zone for the second track segment, and drive the second coil using the second current reference generated by the second control module with the other second set of controller gains to control movement of the mover when the location of the axis is in the second zone for the second track segment.

9. The transport system of claim 8, wherein the second zone for the second track segment is adjacent to the second zone for the first track segment.

10. The transport system of claim 8, wherein the track includes a junction coupling the first track segment and the second track segment, wherein the second zone for the second track segment is adjacent to the second zone for the first track segment at the junction.

11. The transport system of claim 8, further comprising a third controller in communication with the first controller and the second controller.

12. A method to extend range of operations in an independent mover transport system comprising
a mover having an axis,
a track comprising a first track segment including a first coil, a second track segment adjacent to the first track segment and including a second coil, and a controller having a memory operative to store a first set of controller gain values and a second set of controller gain values, wherein the controller is operative to drive the first coil to control movement of the mover along the first track segment towards the second track segment, the method comprising:
moving the mover along the track;
defining a first zone for the first track segment corresponding to the first set of controller gain values;
defining a second zone for the first track segment corresponding to the second set of controller gain values;
generating a current reference with a control module using the first set of controller gains when the location of the axis is in the first zone,
driving the first coil using the current reference generated by the control module with the first set of controller gains to control movement of the mover when the location of the axis is in the first zone;
generating the current reference with the control module using the second set of controller gains when the location of the axis is in the second zone; and
driving the first coil using the current reference generated by the control module with the second set of controller gains to control movement of the mover when the location of the axis is in the second zone.

13. The method of claim 12, wherein the controller includes a proportional-integral-derivative (PID) control module, wherein the first set of controller gain values includes a first proportional gain value, a first integral gain value, and a first derivative gain value, and wherein the second set of controller gain values includes a second proportional gain value, a second integral gain value, and a second derivative gain value.

14. The method of claim 12 further comprising:
defining a transition zone for the first track segment, the transition zone being located between the first zone and the second zone;
interpolating a third set of controller gain values using the first set of controller gain values and the second set of controller gain values when the location of the axis is in the transition zone, the interpolation of the third set being based on the position of the axis;

generating the current reference with the control module using the third set of controller gains when the location of the axis is in the transition zone; and driving the first coil using the current reference generated by the control module with the third set of controller gains to control movement of the mover when the location of the axis is in the transition zone.

15. The method of claim 14, wherein the interpolation of the third set of controller gain values is a linear interpolation between the first set of controller gain values and the second set of controller gain values based on the position of the axis.

16. The method of claim 12 further comprising:
defining a hysteresis zone for the first track segment;
when the mover is moving under the first set of controller gain values, then the first controller gain values switching to the second set of controller gain values when the axis of mover moves though hysteresis zone into the second zone; and
when the mover is moving under the second set of controller gain values, then the second controller gain values switching to the first set of controller gain values when the axis of mover moves though hysteresis zone into the first zone.

17. The method of claim 12, wherein the first track segment includes the controller, wherein the track includes a third track segment adjacent to the second track segment opposite the first track segment, wherein the second track segment includes a second controller having a second memory operative to store another first set of controller gain values and another second set of controller gain values, wherein the second controller is operative to drive the second coil to control movement of the mover along the second track segment towards the third track segment, the method further comprising:
defining a first zone for the second track segment corresponding to the other first set of controller gain values,
defining a second zone for the second track segment corresponding to the other second set of controller gain values,
generating a second current reference with a second control module using the other first set of controller gains when the location of the axis is in the first zone for the second track segment,
driving the second coil using the second current reference generated by the second control module with the other first set of controller gains to control movement of the mover when the location of the axis is in the first zone for the second track segment,
generating the second current reference with the second control module using the other second set of controller gains when the location of the axis is in the second zone for the second track segment, and
driving the second coil using the second current reference generated by the second control module with the other second set of controller gains to control movement of the mover when the location of the axis is in the second zone for the second track segment.

18. The method of claim 17, wherein the second zone for the second track segment is adjacent to the second zone for the first track segment.

* * * * *